(12) United States Patent
Noda (10) Patent No.: US 9,059,483 B2
(45) Date of Patent: Jun. 16, 2015

(54) SELECTIVE OXYGEN-PERMEABLE SUBSTRATE, POSITIVE ELECTRODE FOR METAL-AIR BATTERY, METAL-AIR BATTERY, AND SELECTIVE OXYGEN-PERMEABLE MEMBRANE

(75) Inventor: Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 132 days.

(21) Appl. No.: 13/542,059

(22) Filed: Jul. 5, 2012

(65) Prior Publication Data

US 2013/0011753 A1  Jan. 10, 2013

Related U.S. Application Data

(60) Provisional application No. 61/552,675, filed on Oct. 28, 2011.

(30) Foreign Application Priority Data

Jul. 6, 2011  (JP) ................................. 2011-149745
May 11, 2012  (JP) ................................. 2012-109607

(51) Int. Cl.
 *H01M 4/36* (2006.01)
 *H01M 12/06* (2006.01)
 *H01M 4/02* (2006.01)

(52) U.S. Cl.
 CPC ........ *H01M 12/06* (2013.01); *H01M 2004/028* (2013.01)

(58) Field of Classification Search
 CPC ... H01M 4/13; H01M 4/8605; H01M 4/8657; H01M 4/9083; H01M 8/1002; H01M 2004/028

USPC .......................................................... 429/405
See application file for complete search history.

(56) References Cited

U.S. PATENT DOCUMENTS

| 5,733,677 A * | 3/1998 | Golovin et al. ................ 429/407 |
| 2009/0202876 A1* | 8/2009 | Shimamura et al. ............ 429/21 |
| 2011/0070505 A1* | 3/2011 | Takechi et al. ................ 429/402 |

FOREIGN PATENT DOCUMENTS

| JP | 05-062687 A1 | 3/1993 |
| JP | 07-014565 A1 | 1/1995 |
| JP | 07-105991 A1 | 4/1995 |
| JP | 11-262643 A1 | 9/1999 |
| JP | 2003-053125 A1 | 2/2003 |

OTHER PUBLICATIONS

U.S. Appl. No. 13/551,751, filed Jul. 18, 2012, Toshihiro Tomita.

* cited by examiner

*Primary Examiner* — Jane Rhee
(74) *Attorney, Agent, or Firm* — Burr & Brown, PLLC (57) ABSTRACT

There is provided a selective oxygen-permeable substrate including: a selective oxygen-permeable membrane having an inorganic framework and a transition metal ion complex and being capable of selectively permeating oxygen, and a porous substrate disposed on one surface of the selective oxygen-permeable membrane. Preferably, the transition metal ion complex is bonded to the inorganic framework. More preferably, a material constituting the inorganic framework is at least one kind selected from the group consisting of silica, titania, alumina, and zirconia. The selective oxygen-permeable substrate can selectively introduce oxygen in the air into the inside and has high durability against an electrolytic solution.

16 Claims, 2 Drawing Sheets

SELECTIVE OXYGEN-PERMEABLE SUBSTRATE, POSITIVE ELECTRODE FOR METAL-AIR BATTERY, METAL-AIR BATTERY, AND SELECTIVE OXYGEN-PERMEABLE MEMBRANE

BACKGROUND OF THE INVENTION

1. Field of the Invention

The present invention relates to a selective oxygen-permeable substrate, a positive electrode for a metal-air battery, a metal-air battery, and a selective oxygen-permeable membrane. More specifically, the present invention relates to a selective oxygen-permeable substrate capable of selectively introducing oxygen in the air into the inside and having high durability against an electrolytic solution. Further, the present invention relates to a positive electrode for a metal-air battery provided with the selective oxygen-permeable substrate and to a metal-air battery provided with the positive electrode for a metal-air battery. Furthermore, the present invention relates to a selective oxygen-permeable membrane capable of selectively permeating oxygen in the air and having high durability against an electrolytic solution.

A metal-air battery has a very large discharge capacity per "unit mass of positive-electrode active material" because metal is used as a negative-electrode active material and because oxygen is used as the positive-electrode active material. In recent years, increase in capacity and output of a battery has been required for electric automobiles, mobile devices, etc., and raising performance of the metal-air battery has been expected.

As described above, since the positive-electrode active material of the metal-air battery is oxygen, oxygen in the air can be used as the positive-electrode active material. However, if the air is introduced into the metal-air battery as it is, carbon dioxide in the air is also introduced therein. Since carbon dioxide may react with the electrolytic solution used in the metal-air battery to deteriorate the battery performance, it is desirable to inhibit carbon dioxide from being introduced into the metal-air battery. Thus, there was a problem of introduction of carbon dioxide into the metal-air battery in the case of using oxygen in the air as the positive electrode of the metal-air battery though it is preferable that carbon dioxide is not introduced into the positive electrode of the metal-air battery.

2. Description of Related Art

In order to solve such a problem, there is studied a method where an oxygen permeable polymer membrane is attached to the positive electrode of a metal-air battery or a fuel battery to selectively take in oxygen from the air by the oxygen permeable polymer membrane (see, e.g., JP-A-5-62687, JP-A-7-105991, and JP-A-7-14565).

On the other hand, there is studied an oxygen permeable polymer membrane capable of concentrating oxygen contained in the air (see, e.g., JP-A-11-262643 and JP-A-2003-53125).

In the air batteries described in JP-A-5-62687, JP-A-7-105991, and JP-A-7-14565, since a polymer membrane is used as the oxygen permeable membrane, there is room for further improving the durability against the electrolytic solution.

In the oxygen permeable polymer membranes described in JP-A-11-262643 and JP-A-2003-53125, since a polymer membrane is used as the oxygen permeable membrane, there is room for further improving the durability against the electrolytic solution.

SUMMARY OF THE INVENTION

The present invention has been made in view of the aforementioned problems and aims to provide a selective oxygen-permeable substrate capable of selectively introducing oxygen in the air into the inside thereof and having high durability against an electrolytic solution. Further, the present invention aims to provide a positive electrode for a metal-air battery provided with the selective oxygen-permeable substrate and a metal-air battery provided with the positive electrode for a metal-air battery. Further, the present invention aims to provide a selective oxygen-permeable membrane capable of being used for the aforementioned selective oxygen-permeable substrate, selectively permeating oxygen in the air, and having high durability against an electrolytic solution.

[1] A selective oxygen-permeable substrate comprising: a selective oxygen-permeable membrane having an inorganic framework and a transition metal ion complex and being capable of selectively permeating oxygen, and a porous substrate disposed on one surface of the selective oxygen-permeable membrane.

[2] The selective oxygen-permeable substrate according to [1], wherein the transition metal ion complex is bonded to the inorganic framework.

[3] The selective oxygen-permeable substrate according to [1] or [2], wherein a material constituting the inorganic framework is at least one kind selected from the group consisting of silica, titania, alumina, and zirconia.

[4] The selective oxygen-permeable substrate according to any one of [1] to [3], wherein the transition metal ion complex has: "at least one kind of transition metal ion selected from the group consisting of cobalt (II), copper (I), iron (II), nickel (II), manganese (II), ruthenium (II), ruthenium (III), and rhodium (III)", and "at least one kind of ligand selected from the group consisting of porphyrin, phthalocyanine, cyclidene, Schiff base, and derivatives thereof, which is coordinated to the transition metal ion".

[5] The selective oxygen-permeable substrate according to any one of [1] to [4], wherein a material for the porous substrate is at least one kind selected from the group consisting of ceramics, carbon, and metals.

[6] A positive electrode for a metal-air battery provided with the selective oxygen-permeable substrate according to any one of [1] to [5].

[7] The positive electrode for a metal-air battery according to [6], which is further provided with a catalyst for a metal-air battery loaded on the selective oxygen-permeable substrate.

[8] A metal-air battery comprising: a positive electrode, a negative electrode employing metal lithium as the negative-electrode active material, and an electrolyte layer present between the positive electrode and the negative electrode; wherein the positive electrode is a positive electrode for a metal-air battery according to [6] or [7].

[9] A selective oxygen-permeable membrane having an inorganic framework and a transition metal ion complex and being capable of selectively permeating oxygen.

[10] The selective oxygen-permeable membrane according to [9], wherein the transition metal ion complex is bonded to the inorganic framework.

[11] The selective oxygen-permeable membrane according to [9] or [10], wherein a material for constituting the inorganic framework is at least one kind selected from the group consisting of silica, titania, alumina, and zirconia.

[12] The selective oxygen-permeable membrane according to any one of [9] to [11], wherein the transition metal ion complex has: at least one kind of transition metal ion selected from the group consisting of cobalt (II), copper (I), iron (II), nickel (II), manganese (II), ruthenium (II), ruthenium (III), and rhodium (III), and at least one kind of ligand selected from the group consisting of porphyrin, phthalocyanine, cyclidene, Schiff base, and derivatives thereof, which is coordinated to the transition metal ion.

A selective oxygen-permeable substrate of the present invention is provided with a selective oxygen-permeable membrane "having an inorganic framework and a transition metal ion complex and being capable of selectively permeating oxygen" and a porous substrate "disposed on one surface of the selective oxygen-permeable membrane". Therefore, according to a selective oxygen-permeable substrate of the present invention, oxygen can selectively be taken in by the transition metal ion complex, and oxygen can selectively be permeated. At this time, carbon dioxide is inhibited from entering the selective oxygen-permeable substrate of the present invention. In addition, in a selective oxygen-permeable substrate of the present invention, since the selective oxygen-permeable membrane has an inorganic framework, the selective oxygen-permeable substrate has high durability against the electrolytic solution of a metal-air battery or the like when it is used as a component of a positive electrode for a metal-air battery or the like.

According to a positive electrode for a metal-air battery, since the aforementioned selective oxygen-permeable substrate of the present invention is provided, oxygen in the air can selectively be introduced into the positive electrode for a metal-air battery (into the selective oxygen-permeable substrate). In addition, since a positive electrode for a metal-air battery of the present invention is provided with the aforementioned selective oxygen-permeable substrate of the present invention provided with a selective oxygen-permeable membrane having an inorganic framework, the positive electrode for a metal-air battery has high durability against an electrolytic solution.

According to a metal-air battery of the present invention, since the aforementioned positive electrode for a metal-air battery of the present invention is used as the positive electrode, oxygen in the air can selectively be introduced into the positive electrode for a metal-air battery (into the selective oxygen-permeable substrate). In addition, in a metal-air battery of the present invention, since the aforementioned positive electrode for a metal-air battery of the present invention is used as the positive electrode, the metal-air battery has high durability against an electrolytic solution.

Since a selective oxygen-permeable membrane of the present invention has an inorganic framework and a transition metal ion complex and therefore can selectively permeate oxygen, the membrane can be used as a selective oxygen-permeable membrane constituting the aforementioned selective oxygen-permeable substrate of the present invention.

REFERENCE NUMERALS

1: selective oxygen-permeable substrate, 2: selective oxygen-permeable membrane, 3: gas introduction face, 4: porous substrate, 10: positive electrode for a metal-air battery, 11: positive electrode, 11a: air introduction face, 11b: electrolytic solution introduction face, 12: negative electrode, 13: electrolyte layer, 14: container for air battery, 15: terminal, 16: positive electrode current collector, 17: negative electrode current collector, 100: air battery, A: bonded face

DETAILED DESCRIPTION OF THE INVENTION

Hereinbelow, embodiments of the present invention will specifically be described with referring to drawings. The present invention is by no means limited to the following embodiments, and it should be understood that embodiments obtained by appropriately adding changes, improvements, etc., to the following embodiments on the basis of knowledge of a person of ordinary skill in the art within the range of not deviating from the gist of the present invention are included in the scope of the present invention.

Figure 1:
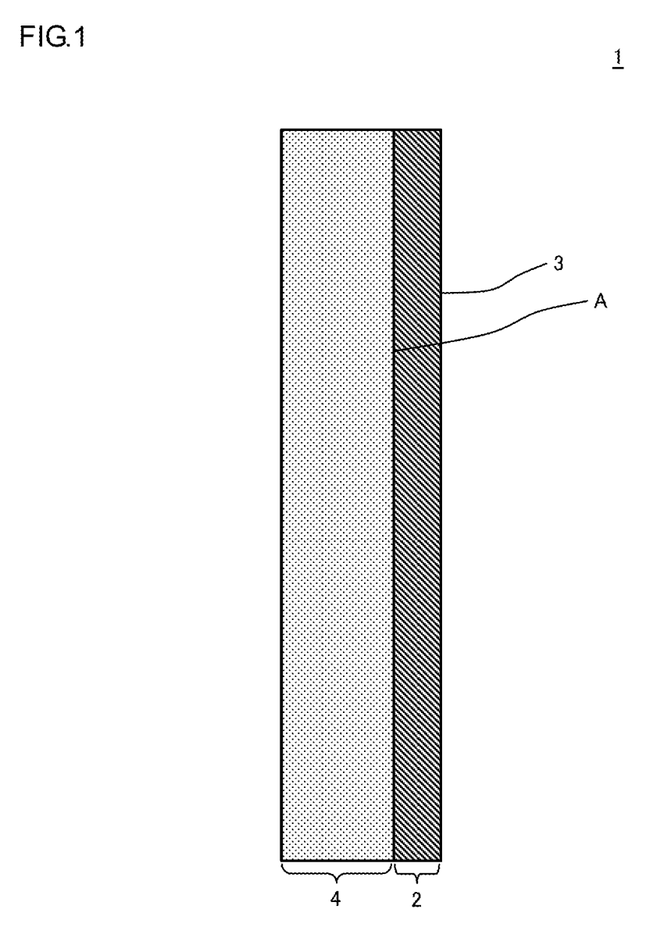
FIG. 1 is a schematic view showing a cross section of an embodiment of a selective oxygen-permeable substrate of the present invention.

(1) Selective Oxygen-Permeable Substrate:

As shown in FIG. 1, an embodiment of a selective oxygen-permeable substrate of the present invention has an inorganic framework and a transition metal ion complex and is provided with a selective oxygen-permeable membrane 2 capable of selectively permeating oxygen and a porous substrate 4 disposed on one surface of the selective oxygen-permeable membrane 2. FIG. 1 is a schematic view showing a cross section of an embodiment (selective oxygen-permeable substrate 1) of a selective oxygen-permeable substrate of the present invention.

Thus, the selective oxygen-permeable substrate of the present embodiment is provided with a selective oxygen-permeable membrane "having an inorganic framework and a transition metal ion complex and being capable of selectively permeating oxygen" and a porous substrate "disposed on one surface of the selective oxygen-permeable membrane". Therefore, according to a selective oxygen-permeable substrate of the present embodiment, oxygen can selectively be taken in by the transition metal ion complex, and oxygen can selectively be permeated. Oxygen can selectively be introduced into the selective oxygen-permeable substrate from the face (gas introduction face 3) opposite to the face bonded to the porous substrate of the selective oxygen-permeable membrane. At this time, carbon dioxide is inhibited from entering the selective oxygen-permeable substrate of the present invention. In addition, in a selective oxygen-permeable substrate of the present invention, since the selective oxygen-permeable membrane has an inorganic framework, the selective oxygen-permeable substrate has high durability against the electrolytic solution of a metal-air battery when it is used as a positive electrode for a metal-air battery or the like. Also, when the selective oxygen-permeable substrate of the present embodiment is used for a positive electrode for a fuel battery, a similar effect can be obtained. It can be confirmed by X-ray diffraction analysis or Raman spectroscopy that the selective oxygen-permeable membrane has an inorganic framework. Also, it can be confirmed by ultraviolet-visible spectroscopy that the selective oxygen-permeable membrane has a transition metal ion complex.

In the selective oxygen-permeable substrate 1 of the present embodiment, oxygen in the air is introduced into the inside from the gas introduction face 3 of the selective oxygen-permeable membrane 2, and the oxygen introduced into the selective oxygen-permeable membrane 2 passes through the selective oxygen-permeable membrane 2 to move to the inside of the porous substrate 4. Therefore, when a reaction (e.g., reaction between lithium ion and oxygen) of a positive electrode is performed in the porous substrate 4 by the use of the selective oxygen-permeable substrate 1 of the present embodiment as a component of a positive electrode for a metal-air battery, oxygen in the air can efficiently be supplied to the positive electrode of the metal-air battery. At the same time, carbon dioxide in the air can be inhibited from entering the positive electrode of the metal-air battery. Incidentally, in the case that the selective oxygen-permeable substrate 1 of the present embodiment is used as a component of a positive electrode for a metal-air battery, the reaction of the positive electrode may be caused in both the porous substrate 4 and the selective oxygen-permeable membrane 2.

The selective oxygen-permeable membrane 2 has an inorganic framework and a transition metal ion complex and can selectively permeate oxygen. It is preferable that the transition metal ion complex is bonded to the inorganic framework in order to maintain the transition metal ion complex in a stable state also in use in the case of using the selective oxygen-permeable substrate 1 as a component for a positive electrode for a metal-air battery or the like. In this case, since the selective oxygen-permeable membrane 2 can be referred to as an organic-inorganic hybrid membrane since the transition metal ion complex is bonded to the inorganic framework. In addition, from the viewpoint of raising the concentration of the transition metal ion complex, it is preferable that a plurality of transition metal ion complexes are bonded to an inorganic framework. It can be confirmed by the change of thermal decomposition temperature of the transition metal ion complexes obtained by thermogravimetric/differential thermal analysis (TG-DTA measurement) that the transition metal ion complex(es) is (are) bonded to the inorganic framework.

Though there is no particular limitation on the bonding of the transition metal ion complex(es) to the inorganic framework, particularly, ion bonding, coordination bonding, hydrogen bonding, or $\pi$-$\pi$ bonding is preferable because they have appropriate bonding strength. When the bonding strength is low, the transition metal ion complex may be detached from the inorganic framework in use. When the bonding strength is too high, coordination of oxygen to the transition metal ion complex may be hindered, thereby reducing the oxygen permeation amount. In a selective oxygen-permeable membrane 2, "one or each of plural" atoms constituting each transition metal ion complex is bonded to "one or each of plural" atoms constituting the inorganic framework.

The inorganic material constituting the inorganic framework is preferably at least one kind selected from the group consisting of silica, titania, alumina and zirconia. The use of such a material enables to raise durability against the electrolytic solution of the metal-air battery or the like. In the case of forming an inorganic framework by the use of silica as the material, it can be said that the inorganic framework is a silica framework. Likewise, in the case of forming an inorganic framework by the use of titania, alumina, or zirconia as the material, it can be said that the inorganic framework is a titania framework, alumina framework, or zirconia framework. The inorganic framework may be formed of a mixture of at least two kinds selected from the group consisting of silica, titania, alumina and zirconia.

In the selective oxygen-permeable membrane 2 of the present embodiment, the transition metal ion complex has a transition metal ion and a ligand coordinated to the transition metal ion. As the transition metal ion, there can be employed at least one kind selected from the group consisting of cobalt (II), copper (I), iron (II), nickel (II), manganese (II), ruthenium (II), ruthenium (III), and rhodium (III). Of these, cobalt (II) is preferable. As the ligand, there can be employed at least one kind selected from the group consisting of porphyrin, phthalocyanine, cyclidene, Schiff base, and derivatives thereof. Of these, porphyrin or a porphyrin derivative is preferable.

In the selective oxygen-permeable membrane 2, it is preferable that the sum of the inorganic framework and the transition metal ion complex(es) accounts for 50 mass % or more in the whole mass. The mass of the transition metal ion complex(es) is preferably 0.1 to 70 mass %, more preferably 0.5 to 50 mass %, particularly preferably 1 to 30 mass %, with respect to the sum of the inorganic framework and the transition metal ion complex(es). When the mass of the transition metal ion complex(es) is less than 0.1 mass %, the function to selectively permeate oxygen may deteriorate. When the mass of the transition metal ion complex(es) is above 70 mass %, durability against an electrolytic solution may deteriorate. In addition, it is preferable that the transition metal ion complexes are uniformly dispersed in the selective oxygen-permeable membrane 2.

Though there is no particular limitation on the shape of the selective oxygen-permeable membrane 2, a plate-like shape, a membrane-like shape, a sheet-like shape, a film-like shape, and a stick-like shape are preferable, for example. In the case that the selective oxygen-permeable membrane 2 is plate-like, the gas introduction face 3 is preferably one of the "pair of faces parallel to each other (front face and back face)" of the "plate". In addition, in the case that the selective oxygen-permeable membrane 2 is membrane-like, sheet-like, or film-like, the gas introduction face 3 is preferably one of the "pair of faces parallel to each other (front face and back face) of the "membrane, sheet, or film".

The thickness of the selective oxygen-permeable membrane 2 (distance from the gas introduction face 3 to the other face parallel to the gas introduction face 3) is preferably 0.01 to 100 μm, more preferably 0.1 to 50 psi. When it is thinner than 0.01 μm, the effect of selectively introducing oxygen may decrease. When it is thicker than 100 μm, it may become hard for oxygen to move to the porous substrate 4. There is no particular limitation on the area of the gas introduction face 3 of the selective oxygen-permeable membrane 2, and it may appropriately be determined in accordance with the use.

In the selective oxygen-permeable substrate 1 of the present embodiment, the material for the porous substrate 4 is preferably one kind selected from the group consisting of ceramics, carbon, and metals. Preferable examples of the ceramics include silica, titania, alumina, and zirconia. Preferable examples of the metals include stainless steel and noble metals. The use of at least one kind selected from the group consisting of ceramics, carbon, and metals as the material enables to inhibit deterioration of the positive electrode for a metal-air battery by the electrolytic solution in the case that the selective oxygen-permeable substrate 1 of the present embodiment is used as a component for a positive electrode for a metal-air battery. In addition, in the case of employing carbon or metal as the material for the porous substrate 4, since the porous substrate 4 is conductive, conductivity of the positive electrode can be secured when the selective oxygen-permeable substrate 1 of the present embodiment is used as a component for a positive electrode for a metal-air battery. In addition, in the case of using the selective oxygen-permeable substrate 1 of the present embodiment as a component for an positive electrode for a metal-air battery with employing ceramic as the material for the porous substrate 4, a compound of the ceramic and a conductive member (e.g., positive electrode current collector) may be employed in order to secure conductivity of the positive electrode.

Though there is no particular limitation on the shape of the porous substrate 4, a plate-like shape, a membrane-like shape, a sheet-like shape, a film-like shape, and a stick-like shape are preferable, for example.

As the porous substrate 4, a known substrate can be used. The thickness of the porous substrate 4 (distance from the face bonded to the selective oxygen-permeable membrane 2 (bonded face A) to the face located on the back side with respect to the "bonded face A" (back face when the bonded face A is a front face)) is preferably 1 to 500 μm. The thickness of the porous substrate 4 is more preferably 2 to 100 μm, particularly preferably 5 to 50 μm. When it is thinner than 1 μm, it may become difficult to handle the selective oxygen-permeable substrate 1 of the present embodiment. When it is thicker than 500 μm, it may become hard for the oxygen passing through the selective oxygen-permeable membrane 2 and being introduced to the porous substrate 4 to be supplied to the entire porous substrate 4. There is no particular limitation on the area of the aforementioned "bonded face A", and it may appropriately be determined in accordance with the use.

The selective oxygen-permeable substrate of the present embodiment may further have a water-repellent layer (not illustrated). The selective oxygen-permeable substrate of the present embodiment can inhibit water from entering the inside by having the water-repellent layer. This can inhibit the positive electrode for a metal-air battery from being influenced by water in the case that the selective oxygen-permeable substrate of the present embodiment is used as a component for a positive electrode for a metal-air battery.

The material for the water-repellent layer is preferably fluororesin or the like. The water-repellent layer may be disposed on the gas introduction face of the selective oxygen-permeable membrane or between the selective oxygen-permeable membrane and the porous substrate. In the case that the water-repellent layer is disposed on the gas introduction face of the selective oxygen-permeable membrane, the gas introduction face is not exposed to the outside. However, the gas introduction face may be in the state of being exposed to the outside or being not exposed to the outside. The shape of the water-repellent layer may preferably be a plate-like shape, a membrane-like shape, a sheet-like shape, a film-like shape, or a stick-like shape. There is no particular limitation on the thickness of the water-repellent layer as long as water is not permeated. The water-repellent layer is preferably a porous water-repellent layer.

(2) Method for Manufacturing Selective Oxygen-Permeable Substrate:

Next, a method for manufacturing an embodiment (selective oxygen-permeable substrate 1 (see FIG. 1)) of an embodiment of a selective oxygen-permeable substrate of the present invention will be described. The method for manufacturing a selective oxygen-permeable substrate is not limited to the following method.

As a method for manufacturing the selective oxygen-permeable substrate of the present embodiment, there can be employed, for example, a method for manufacturing a selective oxygen-permeable substrate by manufacturing a porous substrate and laminating a selective oxygen-permeable membrane on the porous substrate. Hereinbelow, the method will be described step by step.

Though there is no particular limitation on the method for manufacturing a porous substrate, for example, the following method is preferable.

When the material for the porous substrate 4 is ceramic, in the first place, a forming raw material containing a powdered ceramic raw material is prepared. As the ceramic raw material, preferred are the aforementioned preferable materials for an embodiment of a selective oxygen-permeable substrate of the present invention. It is preferable that a slurried forming raw material is prepared by mixing, as necessary, a pore former, a plasticizer, a dispersant, a dispersion medium, and the like into the ceramic raw material. Next, the slurried forming raw material is formed to have a sheet-like shape to form a green sheet for a porous substrate. The green sheet is preferably dried and degreased and then fired to obtain a porous substrate.

When the material for the porous substrate 4 is carbon, for example, a powdered or fibrous carbon raw material (amorphous carbon, graphite, carbon nanotube, fullerene, mesoporous carbon, etc.) is prepared. Then, it is preferable that, as necessary, a binder, a pore former, a plasticizer, a dispersant, a dispersion medium, etc., are mixed into the carbon raw material to prepare a slurried forming raw material. Next, the slurried forming raw material is preferably formed into a sheet-like shape to obtain a porous substrate. As another production method, it is also preferable to obtain a porous substrate by subjecting a polymer raw material formed to have a sheet-like shape to a carbonization treatment.

When the material for the porous substrate 4 is metal, for example, it is preferable that a powdered or fibrous metal raw material is formed to have a sheet-like shape and then sintered to obtain a porous substrate. As another production method, it is also preferable to obtain a porous substrate by subjecting a resin balloon to metal plating and heating. As still another production method, it is also preferable to obtain a porous substrate by forming a fibrous metal raw material to have a mesh shape.

Next, the selective oxygen-permeable substrate is manufactured by laminating a selective oxygen-permeable membrane on the porous substrate. For example, in the first place, it is preferable to prepare a precursor solution for forming a membrane by mixing the raw materials for an inorganic framework and a transition metal ion complex. Then, it is preferable to coat the porous substrate with the precursor solution by a method such as dip coating, spin coating, drip coating, spray coating, or the like to obtain a coated body. Next, the coated body is preferably dried and thermally treated to obtain a selective oxygen-permeable membrane.

The conditions for the aforementioned manufacturing process can appropriately be determined so that a desired selective oxygen-permeable substrate is obtained.

(3) Positive Electrode for a Metal-Air Battery:

An embodiment of a positive electrode for a metal-air battery of the present invention is provided with an embodiment (selective oxygen-permeable substrate 1 (see FIG. 1)) of a selective oxygen-permeable substrate 1 of the present invention. The positive electrode 10 for a metal-air battery of the present embodiment (see FIG. 2) is preferably further provided with a catalyst for a metal-air battery loaded on the selective oxygen-permeable substrate 1.

Since the positive electrode for a metal-air battery of the present embodiment is provided with an embodiment (selective oxygen-permeable substrate 1 (see FIG. 1)) of a selective oxygen-permeable substrate of the present invention, oxygen in the air can selectively be introduced into the positive electrode for a metal-air battery (into the selective oxygen-permeable substrate). In addition, since a positive electrode for a metal-air battery of the present invention is provided with the aforementioned selective oxygen-permeable substrate of the present invention provided with a selective oxygen-permeable membrane having an inorganic framework, the positive electrode has high durability against an electrolytic solution.

It is preferable that the catalyst for a metal-air battery is loaded on the porous substrate in the selective oxygen-permeable substrate. The catalyst may be loaded on the porous substrate and the selective oxygen-permeable membrane.

As the catalyst for a metal-air battery, there can be employed compounds containing manganese, Au, $Co_3O_4$, NiO, $Fe_2O_3$, Pt, Pd, $RuO_2$, CuO, $V_2O_5$, $MoOP_3$, $Y_2O_3$, carbon, or the like. Of these, compounds containing manganese are particularly preferable, and manganese oxides are more preferable. Examples of the manganese oxides include manganese dioxides ($\alpha$-$MnO_2$, $\beta$-$MnO_2$, etc.).

On the positive electrode for a metal-air battery of the present embodiment, a conductive member (e.g., positive electrode current collector) may be disposed in order to improve conductivity. As the conductive member, a member made of carbon or metal may be employed.

Figure 2:
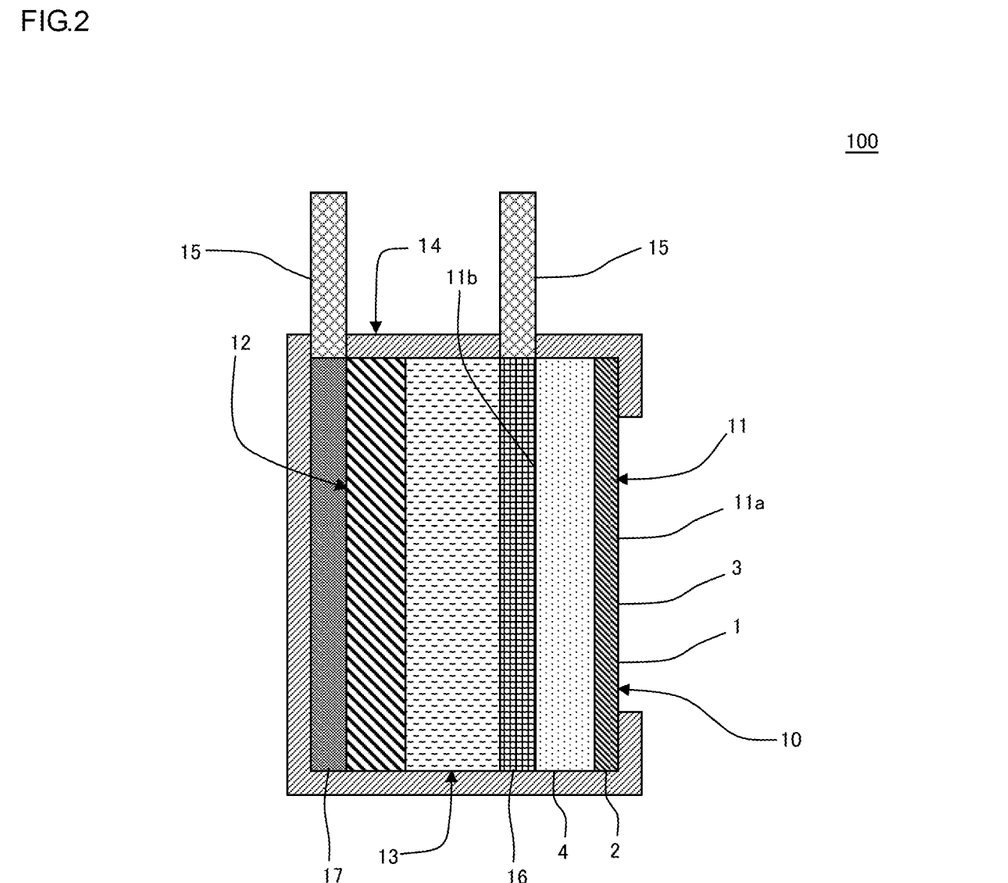
FIG. 2 is a schematic view showing across section of an embodiment of a metal-air battery of the present invention.

(4) Metal-Air Battery:

As shown in FIG. 2, an embodiment of a metal-air battery of the present invention is provided with a positive electrode 11, a negative electrode 12 using metal lithium as the negative electrode active material and an electrolyte layer 13 present between the positive electrode 11 and the negative electrode 12. The electrolyte layer 13 is obtained by impregnating a substrate such as a glass filter or a polyolefin porous membrane with an electrolytic solution. The metal-air battery 100 of the present embodiment is one embodiment (positive electrode 10 for a metal-air battery) where the positive electrode 11 is a positive electrode for a metal-air battery of the present invention. FIG. 2 is a schematic view showing a cross section of one embodiment (air battery 100) of a metal-air battery of the present invention.

Since the metal-air battery of the present embodiment employs one embodiment of a positive electrode for a metal-air battery of the present invention as the positive electrode, oxygen in the air can selectively be introduced into the positive electrode for a metal-air battery (into the selective oxygen-permeable substrate). In addition, since a metal-air battery of the present invention employs the aforementioned positive electrode for a metal-air battery of the present invention as the positive electrode, the metal-air battery has high durability against the electrolytic solution.

As shown in FIG. 2, in the metal-air battery 100 of the present embodiment, the positive electrode 11 is preferably disposed in such a manner that one face (electrolytic solution introduction face 11b) is brought into contact with the electrolytic solution (electrolyte layer) by means of the positive electrode current collector 16 and that the other surface (air introduction face 11a) is brought into contact with the air. The positive electrode current collector 16 is preferably disposed between the electrolyte layer 13 and the positive electrode 11. It is preferable that a conductive terminal 15 protruding outside is connected to the positive electrode current collector 16. Though there is no particular limitation on the material for the positive electrode current collector 16 as long as it is conductive, preferred are carbon, platinum, stainless steel, aluminum, and the like. Though there is no particular limitation on the material for the terminal 15 as long as it is conductive, preferred are platinum, stainless steel, aluminum, copper, nickel, and the like. The gas introduction face of the selective oxygen-permeable membrane of the selective oxygen-permeable substrate functions as the air introduction face 11a of the positive electrode of the metal-air battery. In the case that the positive electrode 11 has, for example, a plate-like shape, a membrane-like shape, a sheet-like shape, or a film-like shape, the "one face" and the "other face" of the positive electrode 11 are preferably the "front face" and the "back face" of the plate-like shape, membrane-like shape, sheet-like shape, or film-like shape.

In the metal-air battery 100 of the present embodiment, the electrolytic solution with which the electrolyte layer 13 is impregnated is preferably a non-aqueous electrolytic solution, aqueous electrolytic solution, or a combination of both of them (they are not mixed together, but a plurality of layers are formed by means of a separator or the like). As the electrolytic solution, a known electrolytic solution can be employed.

The metal-air battery 100 of the present embodiment may be provided with a membrane-like (layered) separator (not illustrated) between the positive electrode and the negative electrode. There is no particular limitation on the material for the separator as long as it is durable in use of the metal-air battery. It is preferable that a negative electrode current collector 17 is disposed on the face opposite to the face having the electrolyte layer 13 disposed thereon of the positive electrode 12. In addition, it is preferable that a conductive terminal 15 protruding outside is connected to the negative electrode current collector 17. Though there is no particular limitation on the material for the negative electrode current collector 17 as long as it is conductive, preferred are carbon, platinum, stainless steel, copper, nickel, and the like.

As shown in FIG. 2, the metal-air battery 100 of the present embodiment is obtained by disposing the positive electrode 11, the negative electrode 12, and the electrolyte layer 13 in the container (casing) 14 for the metal-air battery. The container 14 for the metal-air battery is preferably formed of stainless steel or the like. Though the container 14 for the metal-air battery can have a desired shape, the shape preferably enables the ambient air to be supplied to the air introduction face 11a of the positive electrode 11. For example, as shown in FIG. 2, it is preferable that the shape enables the air introduction face 11a of the positive electrode 11 to be exposed to the outside. The thickness of the container 14 for the metal-air battery can appropriately be determined in accordance with the size and the like of the metal-air battery.

(5) Selective Oxygen-Permeable Membrane:

An embodiment of a selective oxygen-permeable membrane of the present invention has an inorganic framework and a transition metal ion complex and can selectively permeate oxygen. The selective oxygen-permeable membrane of the present embodiment can be employed as a selective oxygen-permeable membrane constituting one embodiment of the aforementioned selective oxygen-permeable substrate of the present invention. The conditions for the selective oxygen-permeable membrane of the present embodiment are preferably the same as those for the selective oxygen-permeable membrane constituting one embodiment of the aforementioned selective oxygen-permeable substrate of the present invention.

EXAMPLE

Hereinbelow, the present invention will be described more specifically by Examples. However, the present invention is by no means limited to these Examples.

Example 1

Cobalt (II) phthalocyanine (CoPh) was dissolved in dodecylbenzenesulfonic acid. Then, phenylmethoxysilane (PhTMS) was added to the resultant solution, and 1 mass % of nitric acid aqueous solution was added thereto while stirring the solution at room temperature for 24 hours to prepare a precursor solution (sol) for a membrane. The mass ratio of the CoPh to PhTMS was 20:80 (CoPh:PhTMS). The concentration of CoPh in the precursor solution was 2 mass %. Incidentally, CoPh was bonded to PhTMS by π-π bonding. The precursor solution was coated on the porous carbon sheet (porous substrate) and dried by heating at 150° C. to obtain a selective oxygen-permeable substrate where a homogeneous selective oxygen-permeable membrane was disposed on the surface of the porous substrate. The thickness of the selective oxygen-permeable membrane was 4 μm.

The resultant selective oxygen-permeable substrate was subjected to the "gas permeation test" according to the following method. The results are shown in Table 1.

A small amount of the precursor solution was weighed and dried by heating at 150° C. to obtain a powder constituted of the same material as that for the selective oxygen-permeable membrane. Using the powder, the following measurement was performed. Since vibrations identified as silica were observed by Raman spectroscopy using an argon laser, it was confirmed that the material constituting the selective oxygen-permeable membrane had an inorganic framework. In addition, since an absorption peak identified as a transition metal ion complex was observed by ultraviolet-visible spectroscopy, it was confirmed that the material constituting the selective oxygen-permeable membrane had a transition metal ion complex. As a result of performing thermogravimetric/differential thermal analysis (TG-DTA measurement) in the ambient air, the thermal decomposition temperature of the transition metal ion complex in the material constituting the selective oxygen-permeable membrane is higher than that of a transition metal ion complex simple substance. This enabled to confirm bonding of a transition metal ion complex to the inorganic framework. Also, regarding the selective oxygen-permeable membranes constituting the selective oxygen-permeable substrates of Examples 2 to 4 shown below, it was confirmed that each of the membrane had an inorganic framework and a transition metal ion complex and that the transition metal ion complex was bonded to the inorganic framework.

(Gas Permeation Test)

Dry air was supplied at 100 cm$^3$/min. on one face side of the membrane disposed on the porous substrate. Then, the components of the gas (permeated gas) discharged on the other face side through the membrane were analyzed by the use of a gas chromatography to obtain oxygen concentration of the permeated gas.

TABLE 1

|  | Oxygen concentration (vol %) | Carbon dioxide concentration (vol %) |
| --- | --- | --- |
| Example 1 | 96 | 0 |
| Example 2 | 94 | 0 |
| Example 3 | 80 | 0 |
| Example 4 | 89 | 0 |
| Comp. Ex. 1 | 21 | 0.04 |

Example 2

Sulfonate group-containing cobalt (II) porphyrin (SCoPo) was dissolved in 1 mass % of a nitric acid aqueous solution. Then, aminopropyltriethoxysilane (ATMS) was added to the solution obtained above, and the solution was stirred for reaction at room temperature for 24 hours to prepare a precursor solution (sol) for forming a membrane. The mass ratio of SCoPo to ATMS was 20:80 (SCoPo:ATMS). The CoPh concentration in the precursor solution was 2 mass %. Incidentally, the SCoPo was bonded to ATMS by ion bonding. The precursor solution for forming a membrane was applied on a porous alumina plate (porous substrate) and dried by heating at 150° C. to obtain a selective oxygen-permeable substrate where a homogeneous selective oxygen-permeable membrane was disposed on a surface of a porous substrate. The thickness of the selective oxygen-permeable membrane was 2 μm.

The selective oxygen-permeable substrate obtained above was subjected to the "gas permeation test" according to the following method. The results are shown in Table 1.

Example 3

There was prepared a precursor solution (sol) for forming a membrane in the same manner as in Example 1 except that "copper (I) phthalocyanine" was used in place of "CoPh". Then, in the same manner as in Example 1, there was produced a selective oxygen-permeable substrate where a uniform selective oxygen-permeable membrane was disposed on the porous substrate. The thickness of the selective oxygen-permeable membrane was 5 μm.

The selective oxygen-permeable substrate obtained above was subjected to the "gas permeation test" according to the following method. The results are shown in Table 1.

Example 4

There was prepared a precursor solution (sol) for forming a membrane in the same manner as in Example 2 except that "sulfonate group-containing iron (II) phthalocyanine" was used in place of "SCoPh". Then, in the same manner as in Example 2, there was produced a selective oxygen-permeable substrate where a uniform selective oxygen-permeable membrane was disposed on the porous substrate. The thickness of the selective oxygen-permeable membrane was 2 μm.

The selective oxygen-permeable substrate obtained above was subjected to the "gas permeation test" according to the following method. The results are shown in Table 1.

Comparative Example 1

There was produced a laminate where a membrane was disposed on a surface of the porous substrate in the same manner as in Example 2 except that a precursor solution (sol) for forming a membrane was manufactured using only ATMS without using SCoPo. The thickness of the membrane was 2 μm.

The laminate obtained above was subjected to the "gas permeation test" according to the following method. The results are shown in Table 1.

Each of the selective oxygen-permeable substrates of Examples 1 and 2 was immersed in a propylene carbonate, which is used as an electrolytic solution of a lithium-air battery, for 100 hours to confirm durability of the selective oxygen-permeable membrane against the electrolytic solution. Specifically, in the first place, each of the selective oxygen-permeable substrates of Examples 1 and 2 was immersed in propylene carbonate for 100 hours. Then, the selective oxygen-permeable substrate was dried at 100° C. for 24 hours. Then, it was subjected to the aforementioned gas permeation test. As a result, it was confirmed that the selective oxygen-permeable membrane constituting each of the selective oxygen-permeable substrates of Examples 1 and 2 had unchanged oxygen selective permeability even after immersion in propylene carbonate. This enabled to confirm excellent durability of the selective oxygen-permeable membrane constituting each of the selective oxygen-permeable substrates of Examples 1 and 2 against the electrolytic solution. In addition, this enabled to confirm excellent durability of the selective oxygen-permeable substrates of Examples 1 and 2 against the electrolytic solution.

From Table 1, it can be understood that a membrane having an inorganic framework and a transition metal ion complex functions as a selective oxygen-permeable membrane. In addition, it can be understood that a membrane having no transition metal ion complex does not have a function to selectively permeate oxygen.

A lithium-air battery was produced with the selective oxygen-permeable substrate of Example 1 as the positive electrode. A platinum mesh was prepared as the positive electrode current collector. A stainless steel plate was prepared as the negative electrode current collector, and metal lithium was bonded to one face side of the stainless steel plate to produce the negative electrode. As the electrolytic solution, a propylene carbonate solution with 1 mol/liter lithium bistrifluoromethaneslufonylimide was prepared, and a glass filter was soaked with the electrolytic solution to produce an electrolyte layer. A laminate was obtained by laminating the negative electrode current collector, the metal lithium, the electrolyte layer, the positive electrode current collector, and the positive electrode in this order, and, on both the faces of the laminate, an aluminum laminate foil (a laminate of nylon thin membrane, aluminum foil, and polypropylene thin membrane) was laminated to produce a lithium-air battery. Upon the lamination, a container for the lithium-air battery (a container made of the aluminum laminate foil) was formed so as to wrap the laminate. In the face on the positive electrode side of the laminate subjected to the lamination, an air hole (hole formed in the aluminum laminate foil) of 10 mm×10 mm was formed so that the ambient air could be introduced into the positive electrode. A terminal for discharge measurement was connected to each of the negative electrode current collector and the positive electrode current collector. All these steps were performed in a glove box under nitrogen atmosphere.

The lithium-air battery produced above was taken out from the glove box, and constant current discharge measurement was performed with 0.01 mA at 20° C. in the air. As a result, it was confirmed that the lithium-air battery could stably discharge even in the air.

A selective oxygen-permeable substrate and a selective oxygen-permeable membrane of the present invention can suitably be used as components for the positive electrode of a metal-air battery. In addition, a metal-air battery and a positive electrode for a metal-air battery of the present invention can suitably be used in industries using batteries, such as the electric automobile industry.

What is claimed is:

1. A selective oxygen-permeable substrate comprising:
a selective oxygen-permeable membrane having an inorganic framework and a transition metal ion complex and being capable of selectively permeating oxygen, and
a porous substrate disposed on one surface of the selective oxygen-permeable membrane,
wherein the inorganic framework is at least one selected from the group consisting of a silica framework, a titania framework, an alumina framework, and a zirconia framework, and
wherein the membrane is exposed to air.

2. The selective oxygen-permeable substrate according to claim 1, wherein the transition metal ion complex is bonded to the inorganic framework.

3. The selective oxygen-permeable substrate according to claim 1, wherein the transition metal ion complex has:

at least one kind of transition metal ion selected from the group consisting of cobalt (II), copper (I), iron (II), nickel (II), manganese (II), ruthenium (II), ruthenium (III), and rhodium (III), and
at least one kind of ligand selected from the group consisting of porphyrin, phthalocyanine, cyclidene, Schiff base, and derivatives thereof, which is coordinated to the transition metal ion.

4. The selective oxygen-permeable substrate according to claim 2, wherein the transition metal ion complex has:

at least one kind of transition metal ion selected from the group consisting of cobalt (II), copper (I), iron (II), nickel (II), manganese (II), ruthenium (II), ruthenium (III), and rhodium (III), and
at least one kind of ligand selected from the group consisting of porphyrin, phthalocyanine, cyclidene, Schiff base, and derivatives thereof, which is coordinated to the transition metal ion.

5. The selective oxygen-permeable substrate according to claim 1, wherein a material for the porous substrate is at least one kind selected from the group consisting of ceramics, carbon, and metals.

6. The selective oxygen-permeable substrate according to claim 4, wherein a material for the porous substrate is at least one kind selected from the group consisting of ceramics, carbon, and metals.

7. A positive electrode for a metal-air battery provided with the selective oxygen-permeable substrate according to claim 1.

8. A positive electrode for a metal-air battery provided with the selective oxygen-permeable substrate according to claim 6.

9. The positive electrode for a metal-air battery according to claim 7, which is further provided with a catalyst for a metal-air battery loaded on the selective oxygen-permeable substrate.

10. The positive electrode for a metal-air battery according to claim 8, which is further provided with a catalyst for a metal-air battery loaded on the selective oxygen-permeable substrate.

11. A metal-air battery comprising:
a positive electrode,
a negative electrode employing metal lithium as the negative-electrode active material, and
an electrolyte layer present between the positive electrode and the negative electrode;
wherein the positive electrode is a positive electrode for a metal-air battery according to claim 7.

12. A metal-air battery comprising:
a positive electrode,
a negative electrode employing metal lithium as the negative-electrode active material, and
an electrolyte layer present between the positive electrode and the negative electrode;
wherein the positive electrode is a positive electrode for a metal-air battery according to claim 10.

13. A selective oxygen-permeable membrane having an inorganic framework and a transition metal ion complex and being capable of selectively permeating oxygen,
wherein the inorganic framework is at least one selected from the group consisting of a silica framework, a titania framework, an alumina framework, and a zirconia framework, and
wherein the membrane is exposed to air.

14. The selective oxygen-permeable membrane according to claim 13, wherein the transition metal ion complex is bonded to the inorganic framework.

15. The selective oxygen-permeable membrane according to claim 13, wherein the transition metal ion complex has:
- at least one kind of transition metal ion selected from the group consisting of cobalt (II), copper (I), iron (II), nickel (II), manganese (II), ruthenium (II), ruthenium (III), and rhodium (III), and
- at least one kind of ligand selected from the group consisting of porphyrin, phthalocyanine, cyclidene, Schiff base, and derivatives thereof, which is coordinated to the transition metal ion.

16. The selective oxygen-permeable membrane according to claim 14, wherein the transition metal ion complex has:
- at least one kind of transition metal ion selected from the group consisting of cobalt (II), copper (I), iron (II), nickel (II), manganese (II), ruthenium (II), ruthenium (III), and rhodium (III), and
- at least one kind of ligand selected from the group consisting of porphyrin, phthalocyanine, cyclidene, Schiff base, and derivatives thereof, which is coordinated to the transition metal ion.

* * * * *